Nov. 6, 1928.
S. BIREN
1,690,395
CORN AND BUNION PROTECTOR
Filed Jan. 30, 1928
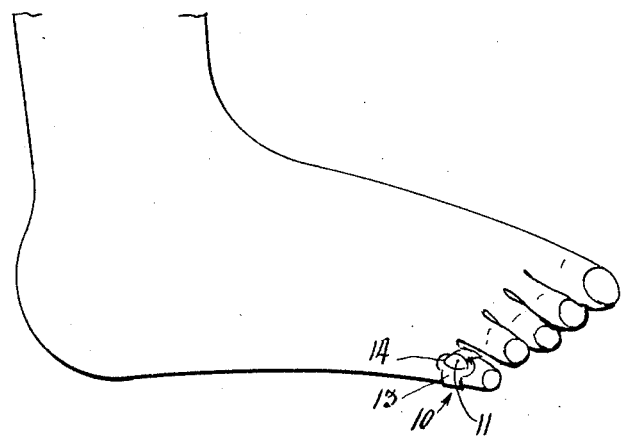
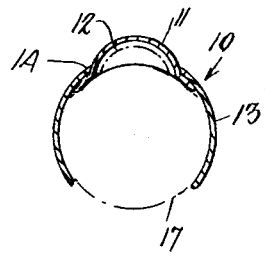
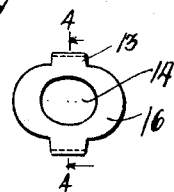
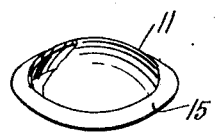
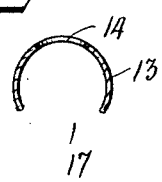
INVENTOR
Simon Biren.
BY
Maurice Block
ATTORNEY Patented Nov. 6, 1928.

1,690,395

UNITED STATES PATENT OFFICE.

SIMON BIREN, OF BROOKLYN, NEW YORK.

CORN AND BUNION PROTECTOR.

Application filed January 30, 1928. Serial No. 250,433.

This invention relates to improvements in corn and bunion protecting devices, and has for one of its objects the provision of a device of the character referred to adapted to fit and be held in place over a corn or bunion without coming in direct contact therewith.

Another object of the invention is to provide a corn or bunion protecting dome and means for maintaining same in position upon a toe.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claim.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In the drawings forming a part of this specification,

Figure 1 is a perspective view of a human foot showing my invention as applied thereto, Fig. 2 is a cross sectional view at an enlarged scale of the dome and retaining ring in place, on a toe shown in dot and dash lines, Fig. 3 is a top plan view of the retaining ring, Fig. 4 is a sectional view thereof taken on line 4—4, Fig. 3, and Fig. 5 is a perspective view of the dome partly broken away.

Referring now to the drawings in detail, 10 indicates my improved corn or bunion protector which comprises a dome or helmet shaped corn protecting member 11 adapted to cover a corn 12 without actually coming in contact therewith so as to keep off any pressure from the said corn (see Fig. 2). The said member 11 may be held in place over the corn by a substantially ring shaped retaining member 13 provided at the top thereof with an opening 14 through which the dome of the member 11 projects. A flange 15 on the member 11 contacts with the underside of the top wall 16 of the ring member 13, and maintains the said dome member over the corn. The ring 13 is open at the bottom 17 thereof, so that a single ring size will fit over various sizes of toes.

Various devices have been tried to meet the requirements of corn sufferers, but none of them provide means whereby the corn is entirely shielded, so that all pressure is kept therefrom.

The device of my invention may be readily placed over any corn and will be properly held in position without irritating the corn by pressure, friction or otherwise.

Both the dome portion 11 and ring 13 may be made of any suitable material such as rubber, celluloid, metal, etc.

From the above it will be seen that I have provided a simple, efficient and inexpensive protector that will keep away all pressure from any corn or other affected area of a toe.

Having described my invention, what I claim as new and desire to secure by Letters Patent, is:

A corn protecting device, comprising a resilient split ring adapted to fit on a toe and having an opening in the top thereof, a dome shaped corn protecting member projecting through the opening, and enlarged top wall portion on the ring and a flange on the dome shaped member in contact with the enlarged portion of the ring to maintain the said member in desired position on the toe.

In testimony whereof I hereunto affix my signature.

SIMON BIREN.